United States Patent
Dimnik et al.

(10) Patent No.: US 12,302,180 B2
(45) Date of Patent: May 13, 2025

(54) ENABLING SPECIAL UE MEASUREMENT BEHAVIOR

(71) Applicant: Nokia Technologies Oy, Espoo (FI)

(72) Inventors: Riikka Karoliina Dimnik, Espoo (FI); Timo Koskela, Oulu (FI); Lars Dalsgaard, Oulu (FI); Jani-Pekka Kainulainen, Cambridge (GB); Sanjay Goyal, Murray Hill, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/898,538

(22) Filed: Sep. 26, 2024

(65) Prior Publication Data

US 2025/0119801 A1    Apr. 10, 2025

Related U.S. Application Data

(60) Provisional application No. 63/542,817, filed on Oct. 6, 2023.

(51) Int. Cl.
*H04W 36/00* (2009.01)

(52) U.S. Cl.
CPC . *H04W 36/0085* (2018.08); *H04W 36/00835* (2018.08)

(58) Field of Classification Search
CPC .................. H04W 36/0085; H04W 36/00835
See application file for complete search history.

(56) References Cited

U.S. PATENT DOCUMENTS

| | | | |
|---|---|---|---|
| 2024/0155449 A1* | 5/2024 | Damnjanovic | H04W 36/008357 |
| 2024/0155456 A1* | 5/2024 | Akl | H04W 36/0055 |
| 2024/0155458 A1* | 5/2024 | Akl | H04W 36/32 |
| 2024/0267820 A1* | 8/2024 | Zhou | H04W 36/302 |
| 2024/0284283 A1* | 8/2024 | Akl | H04W 36/08 |
| 2024/0334538 A1* | 10/2024 | Zhou | H04W 52/0216 |

FOREIGN PATENT DOCUMENTS

WO    WO-2023153408 A1    8/2023

OTHER PUBLICATIONS

3GPP TS 38.300 V18.4.0 3rd Generation Partnership Project; Technical Specification Group Radio Access Network; NR; NR and NG-RAN Overall Description; Stage 2 (Release 18) Dec. 2024.
3GPP TSG-RAN WG4 Meeting #108 R4-2314453 WF on NR Mobility Enhancements, Aug. 21-25, 2023.
3GPP TSG RAN Meeting #101 RP232311, "Status Report to TSG" Sep. 11-15, 2023.

(Continued)

*Primary Examiner* — Kashif Siddiqui
(74) *Attorney, Agent, or Firm* — Joseph C. Drish; McCarter & English, LLP

(57) ABSTRACT

An apparatus configured to: perform candidate target cell measurements based, at least partially, on a first configuration; receive, from a network node, an indication to perform activation of at least one transmission configuration indicator state associated with at least one candidate target cell; determine a configuration for performing candidate target cell measurements in response to the indication to perform activation of the at least one transmission configuration indicator state; and use the configuration to measure a reduced set of candidate target cells indicated with the first configuration.

21 Claims, 7 Drawing Sheets

(56) References Cited

OTHER PUBLICATIONS

Futurewei: "L1 Enhancements for Inter-Cell Beam Management" 3GPP Draft; R1-2304352, $3^{rd}$ Generation Partnership Project, Mobile Competence Centre; 650. Route Des Lucioles; F-06921 Sophia-Antipolis Cedex; France ; May 12, 2023.

Sanjay Goyal et al. "Remaining Issues on Timing Advance Management for L1/L2 Triggered Mobility" 3GPP Draft; R1- 2309734; Type Discussion; NR_MOB_ENH2-CORE $3^{rd}$ Generation Partnership Project, Mobile Competence Centre; 650. Route Des Lucioles; F-06921 Sophia-Antipolis Cedex; France; Sep. 29, 2023.

Xueming Pan et al. "L1 Enhancements for L1/L2 Triggered Mobility" 3GPP Draft; R1-2309083; Type Discussion; NR_MOB_ENH2-CORE $3^{rd}$ Generation Partnership Project, Mobile Competence Centre; 650. Route Des Lucioles; F-06921 Sophia-Antipolis Cedex; France; Sep. 28, 2023.

* cited by examiner

600

610 — perform candidate target cell measurements based, at least partially, on a first configuration

620 — receive, from a network node, an indication to perform activation of at least one transmission configuration indicator state associated with at least one candidate target cell

630 — determine a configuration for performing candidate target cell measurements in response to the indication to perform activation of the at least one transmission configuration indicator state

640 — use the configuration to measure a reduced set of candidate target cells indicated with the first configuration

```
┌─────────────────────────────┐
│ transmit, to a user equipment, a │
│ first configuration for performing │  710
│ candidate target cell         │
│ measurements                  │
└─────────────────────────────┘
              │
              ▼
┌─────────────────────────────┐
│ transmit, to the user equipment, │
│ an indication to perform      │
│ activation of at least one    │
│ transmission configuration    │  720
│ indicator state associated with │
│ at least one candidate target │
│ cell                          │
└─────────────────────────────┘
              │
              ▼
┌─────────────────────────────┐
│ receive, from the user        │
│ equipment, at least one       │
│ measurement report, wherein   │
│ the at least one measurement  │
│ report comprises, at least, an │
│ indication of at least one    │
│ measurement for, at least, a  │
│ reduced set of candidate target │
│ cells indicated with the first │
│ configuration based, wherein  │  730
│ the at least one measurement  │
│ comprises one or more         │
│ measurements performed using  │
│ a configuration for performing │
│ candidate target cell         │
│ measurements in response to   │
│ the indication to perform     │
│ activation of the at least one │
│ transmission configuration    │
│ indicator state               │
└─────────────────────────────┘
```

FIG. 7

ENABLING SPECIAL UE MEASUREMENT BEHAVIOR

TECHNICAL FIELD

The example and non-limiting embodiments relate generally to lower-layer triggered mobility (LTM) and, more particularly, to early candidate cell transmission configuration indicator (TCI) state activation in the LTM procedure.

BACKGROUND

It is known, in LTM, to perform cell switch based on information included in an L1 measurement report.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: perform candidate target cell measurements based, at least partially, on a first configuration; receive, from a network node, an indication to perform activation of at least one transmission configuration indicator state associated with at least one candidate target cell; determine a configuration for performing candidate target cell measurements in response to the indication to perform activation of the at least one transmission configuration indicator state; and use the configuration to measure a reduced set of candidate target cells indicated with the first configuration.

In accordance with one aspect, a method comprising: performing, with a user equipment, candidate target cell measurements based, at least partially, on a first configuration; receiving, from a network node, an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

In accordance with one aspect, an apparatus comprising means for: performing candidate target cell measurements based, at least partially, on a first configuration; receiving, from a network node, an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

In accordance with one aspect, a non-transitory computer-readable medium comprising program instructions stored thereon for performing at least the following: performing candidate target cell measurements based, at least partially, on a first configuration; causing receiving, from a network node, of an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

In accordance with one aspect, an apparatus comprising: at least one processor; and at least one memory storing instructions that, when executed by the at least one processor, cause the apparatus at least to: transmit, to a user equipment, a first configuration for performing candidate target cell measurements; transmit, to the user equipment, an indication to perform activation of at least one transmission configuration indicator state associated with at least one candidate target cell; and receive, from the user equipment, at least one measurement report, wherein the at least one measurement report comprises, at least, an indication of at least one measurement for, at least, a reduced set of candidate target cells indicated with the first configuration based, wherein the at least one measurement comprises one or more measurements performed using a configuration for performing candidate target cell measurements in response to the indication to perform activation of the at least one transmission configuration indicator state.

In accordance with one aspect, a method comprising: transmitting, to a user equipment, a first configuration for performing candidate target cell measurements; transmitting, with a network node to the user equipment, an indication to perform activation of at least one transmission configuration indicator state associated with at least one candidate target cell; and receiving, from the user equipment, at least one measurement report, wherein the at least one measurement report comprises, at least, an indication of at least one measurement for, at least, a reduced set of candidate target cells indicated with the first configuration based, wherein the at least one measurement comprises one or more measurements performed using a configuration for performing candidate target cell measurements in response to the indication to perform activation of the at least one transmission configuration indicator state.

In accordance with one aspect, an apparatus comprising means for: transmitting, to a user equipment, a first configuration for performing candidate target cell measurements; transmitting, to the user equipment, an indication to perform activation of at least one transmission configuration indicator state associated with at least one candidate target cell; and receiving, from the user equipment, at least one measurement report, wherein the at least one measurement report comprises, at least, an indication of at least one measurement for, at least, a reduced set of candidate target cells indicated with the first configuration based, wherein the at least one measurement comprises one or more measurements performed using a configuration for performing candidate target cell measurements in response to the indication to perform activation of the at least one transmission configuration indicator state.

In accordance with one aspect, a non-transitory computer-readable medium comprising program instructions stored thereon for performing at least the following: causing transmitting, to a user equipment, a first configuration for performing candidate target cell measurements; causing transmitting, to the user equipment, of an indication to perform activation of at least one transmission configuration indicator state associated with at least one candidate target cell; and causing receiving, from the user equipment, of at least one measurement report, wherein the at least one measurement report comprises, at least, an indication of at least one measurement for, at least, a reduced set of candidate target cells indicated with the first configuration based, wherein the at least one measurement comprises one or more measurements performed using a configuration for performing candidate target cell measurements in response to the indication to perform activation of the at least one transmission configuration indicator state.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein:

FIG. 6 is a flowchart illustrating steps as described herein; and

FIG. 7 is a flowchart illustrating steps as described herein.

DETAILED DESCRIPTION OF EMBODIMENTS

Figure 1:
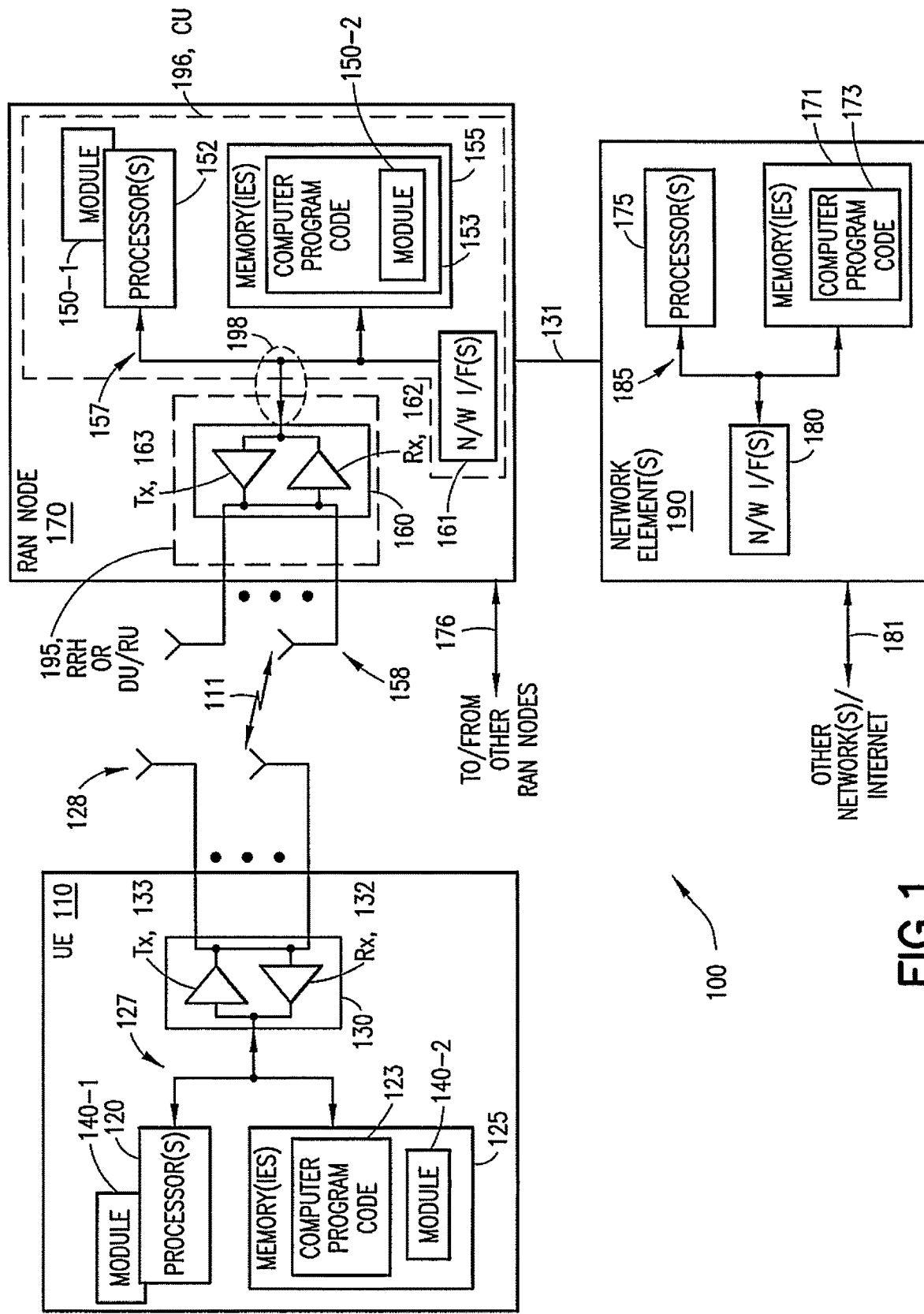
FIG. 1 is a block diagram of one possible and non-limiting example system in which the example embodiments may be practiced.

The following abbreviations that may be found in the specification and/or the drawing figures are defined as follows:

| Abbreviation | Definition |
| --- | --- |
| 3GPP | third generation partnership project |
| 5G | fifth generation |
| 5GC | 5G core network |
| AMF | access and mobility management function |
| CE | control element |
| CFRA | contention free random access |
| cRAN | cloud radio access network |
| CSI-RS | channel state information reference signal |
| CU | central unit |
| DRB | data radio bearer |
| DU | distributed unit |
| eNB (or eNodeB) | evolved Node B (e.g., an LTE base station) |
| EN-DC | E-UTRA-NR dual connectivity |
| en-gNB or En-gNB | node providing NR user plane and control plane protocol terminations towards the UE, and acting as secondary node in EN-DC |
| E-UTRA | evolved universal terrestrial radio access, i.e., the LTE radio access technology |
| gNB (or gNodeB) | base station for 5G/NR, i.e., a node providing NR user plane and control plane protocol terminations towards the UE, and connected via the NG interface to the 5GC |
| I/F | interface |
| L1 | layer 1 |
| L2 | layer 2 |
| L3 | layer 3 |
| LTE | long term evolution |
| LTM | L1/L2/lower-layer triggered mobility |
| MAC | medium access control |
| MME | mobility management entity |
| ng or NG | new generation |
| ng-eNB or NG-eNB | new generation eNB |
| NR | new radio |
| N/W or NW | network |
| O-RAN | open radio access network |
| PCell | primary cell |
| PDCCH | physical downlink control channel |
| PDCP | packet data convergence protocol |
| PHY | physical layer |
| PRACH | physical random access channel |
| PSCell | primary cell of a SCG, primary secondary cell |
| QCL | quasi co-location |
| RACH | random access channel |
| RAN | radio access network |
| RAR | random access response |
| RF | radio frequency |
| RLC | radio link control |
| RRC | radio resource control |
| RRH | remote radio head |
| RRM | radio resource management |
| RS | reference signal |
| RTD | receive timing difference |
| RU | radio unit |
| Rx | receiver |
| SCell | secondary cell |
| SDAP | service data adaptation protocol |
| SGW | serving gateway |
| SMF | session management function |
| SNR | signal to noise ratio |
| SSB | synchronization signal block |
| TA | timing advance |
| TCI | transmission configuration indication |
| Tx | transmitter |

| UE | user equipment (e.g., a wireless, typically mobile device) |
| UPF | user plane function |
| VNR | virtualized network function |

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein may generally relate to L1/L2 triggered mobility (LTM). LTM is a cell switch procedure, where a UE's serving cell (primary cell (PCell) or primary secondary cell (PSCell)) is switched by the network by sending an LTM cell switch command. The LTM cell switch decision can be based on L1 measurements performed and reported by the UE based on an LTM candidate cell configuration provided by the network for one or more LTM candidate cells, which may be neighboring cells or may be one of the UE's current serving cells (e.g. secondary cells (SCells)).

Before the cell switch, the network may optionally activate transmission configuration indicator (TCI) state(s) for one or more candidate cells and the UE may track the timing of the activated TCI state(s) before the cell switch. The UE may also perform early DL and UL synchronization before the cell switch.

The expectation may be that the cell switch may occur shortly after early candidate cell TCI state activation. The time between the early TCI state activation and LTM cell switch command may be considered as period where measuring and reporting all candidate cells does not assist with the network LTM cell switch decision.

The TCI activation may be costly, for example in terms of time and energy consumption, as it requires the UE to track associated DL RSs (SSB or TRS) to acquire and maintain time/frequency synchronization. The activation may only be done for a certain set of RSs associated with one or more potential candidate cells. This may be determined based on the LTM L1 reporting from the UE.

Figure 2:
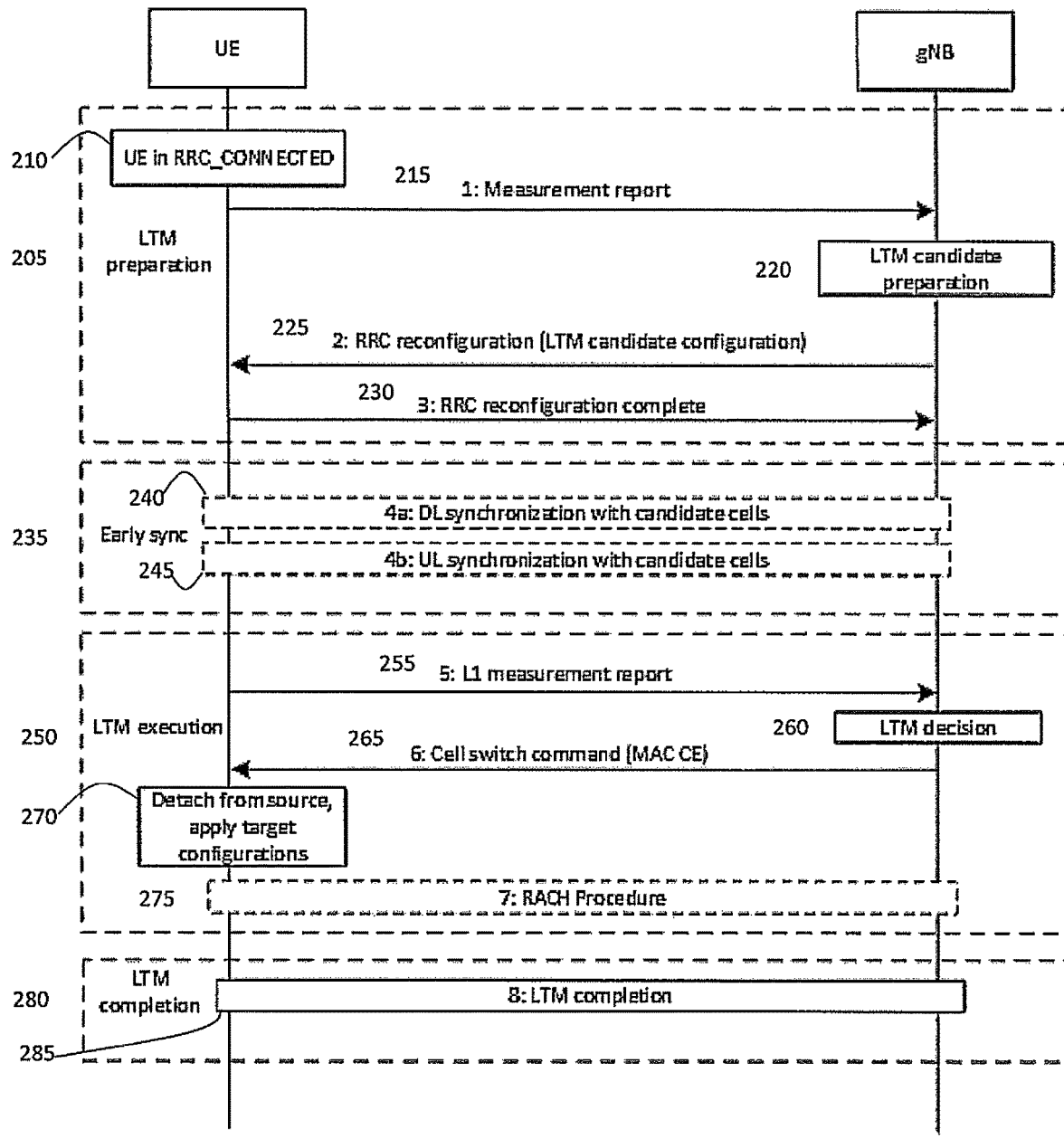
FIG. 2 is a flowchart illustrating steps as described herein.

An example of the LTM procedure is shown in the signaling diagram in FIG. 2 based on RAN2 running change request for TS 38.300.

During an LTM preparation phase 205, at 210 the UE may be in an RRC_CONNECTED mode. At 215, the UE may transmit, to the gNB, a measurement report (e.g. MeasurementReport message). At 220, the gNB may perform LTM candidate preparation. In other words, the gNB may decide to configure LTM and initiate candidate cell(s) preparation. At 225, the gNB may transmit, to the UE, an RRC reconfiguration message (e.g. LTM candidate configuration). The RRCReconfiguration message may include LTM candidate cell configurations of one or multiple candidate cells. The UE may store the LTM candidate cell configurations. At 230, the UE may transmit, to the gNB, an RRC reconfiguration complete message (e.g. RRCReconfigurationComplete message).

During an early synchronization phase 235, at 240 the UE may perform DL synchronization with one or more candidate cells (e.g. before receiving the cell switch command). DL synchronization for candidate cell(s) before cell switch command may be supported, at least, based on synchronization signal blocks (SSB). The UE may perform early timing advance (TA) acquisition with candidate cell(s) requested by the network before receiving the cell switch command. This may be done via contention free random access (CFRA) triggered by a physical downlink control channel (PDCCH) order from the source cell, following which the UE may send a preamble towards the indicated candidate cell. In order to minimize the data interruption of the source cell due to CFRA towards the candidate cell(s), the UE may not receive a random access response (RAR) for the purpose of TA value acquisition, and the TA value of the candidate cell may be indicated in the cell switch command. The UE may not maintain the TA timer for the candidate cell, and may rely on network implementation to guarantee the TA validity. At 245, the UE and gNB may perform UL synchronization with one or more candidate cells.

During a LTM execution phase 250, at 255 the UE may perform L1 measurements on the configured candidate cell (s) and may transmit, to the gNB, a lower-layer measurement reports (e.g. L1 measurement report). L1 measurement may be performed as long as the RRC reconfiguration at 225 applies. At 260, the gNB may make an LTM decision. The gNB may decide to execute cell switch to a target cell. At 265, the gNB may transmit, to the UE, a cell switch command (e.g. medium access control (MAC) control element (CE)). The MAC CE may trigger cell switch by including the candidate configuration index of the target cell. The UE may switch to the target cell and apply the configuration indicated by the candidate configuration index. At 270, the UE may detach from the source cell and apply target configuration(s). At 275, the UE and the gNB may perform a random access channel (RACH) procedure, for example towards the target cell if the UE does not have a valid TA of the target cell.

During a LTM completion phase 280, at 285 the UE and the gNB may perform LTM completion. The UE may complete the LTM cell switch procedure by, for example, sending a RRCReconfigurationComplete message to the target cell. If the UE has performed a RA procedure at 275, the UE may consider that the LTM execution is successfully completed when the random access procedure is successfully completed. For RACH-less LTM, the UE may consider that the LTM execution is successfully completed when the UE determines that the network has successfully received its first UL data. The UE may determine successful reception of its first UL data by receiving a PDCCH addressing the UE's C-RNTI in the target cell, which may schedule a new transmission following the first UL data.

It may be assumed that the RRCReconfigurationComplete message is always sent at each LTM execution.

The early sync phase 235, the LTM execution phase 250, and the LTM completion phase 280 may be performed multiple times for subsequent LTM cell switch using the LTM candidate cell configuration(s) provided at 225.

As to U-plane handling, in LTM, the UE may perform MAC reset. Whether the UE performs radio link control (RLC) re-establishment and packet data convergence protocol (PDCP) data recovery during cell switch may be explicitly controlled by the network through RRC signaling. The PDCP data recovery procedure may be applied to the RLC AM data radio bearers (DRB) for inter-distributed unit (DU) LTM cell switch.

For UE processing, the following (not exhaustive) may be assumed to be performed after receiving the cell switch command: MAC/RLC reset (when configured); radio frequency (RF) retuning (e.g. needed for inter-frequency); and/or baseband retuning.

Figure 3:
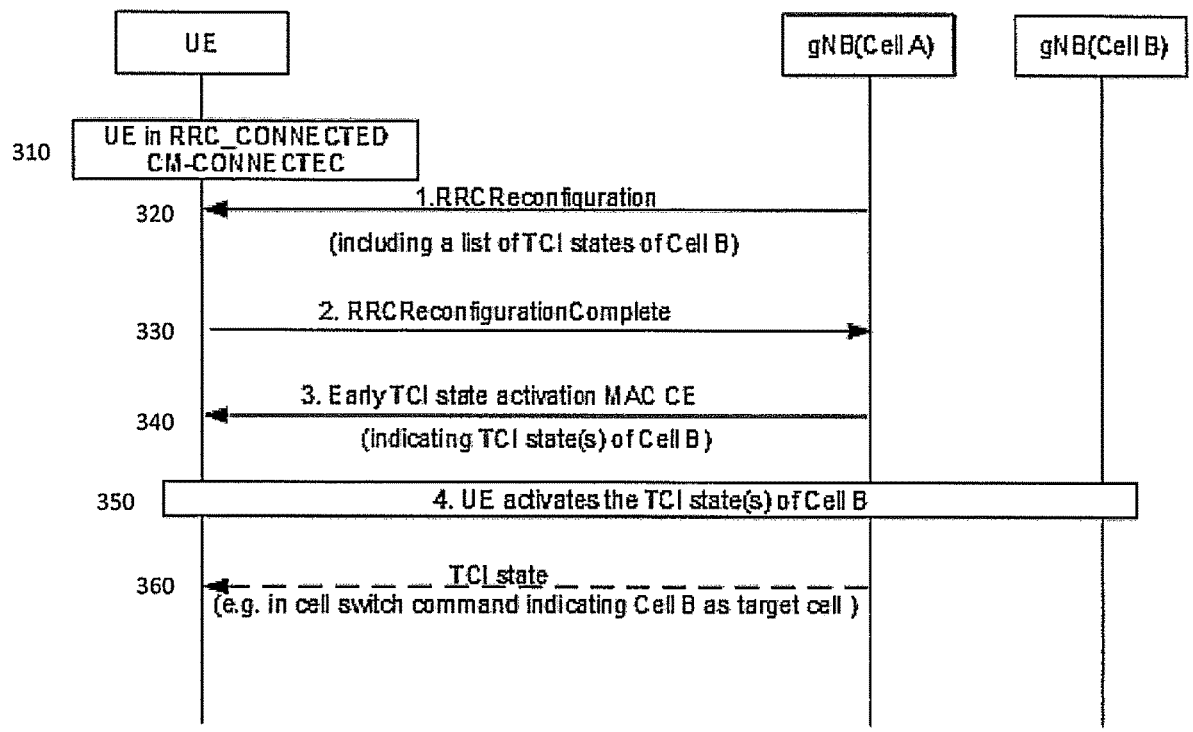
FIG. 3 is a flowchart illustrating steps as described herein.

The unified TCI state framework is used in LTM. The LTM cell switch command indicates a TCI state of the target cell for the UE. TCI state activation for LTM candidate cells may be performed, before the cell switch, with a separate MAC-CE for one or more joint and/or separate DL and UL TCI states. This early TCI state activation may be done for one or more candidate cells. If not performed before the cell switch, the cell switch command may activate and indicate the target TCI state. The example procedure shown in FIG. 3 is based on the RAN2 running CR for 38.300. Early TCI activation (steps 340, 350) in FIG. 3 may be, for example, placed between steps 255 and 265 in FIG. 2.

At 310, the UE may be in an RRC_CONNECTED mode and/or a CM-CONNECTED mode. At 320, the gNB (Cell A) may transmit, to the UE, an RRCReconfiguration message, which may include a list of TCI states of Cell B). The gNB to which Cell A belongs may provide the TA acquisition configuration to the UE within the RRCReconfiguration message. The TA acquisition configuration may include all RRC configuration information required to send a random access preamble to Cell B so that the gNB to which Cell B belongs may calculate a TA value to be used by the UE (e.g. in case an LTM cell switch procedure is executed to Cell B). The TA acquisition configuration may include information for one or multiple cells to which the TA acquisition procedure may be executed by the UE. At 330, the UE may transmit, to the gNB (Cell A) an RRCReconfigurationComplete message. At 340, the gNB (Cell A) may transmit, to the UE, an early TCI state activation MAC CE, which may indicate TCI state(s) of Cell B. At 350, the UE may activate the TCI state(s) of Cell B. At 360, the gNB (Cell A) may transmit, to the UE, a TCI state, for example in a cell switch command indicating Cell B as a target cell.

When a TCI state is activated for a candidate cell, the UE may be expected to keep track of the timing of the activated TCI state.

Features as described herein may generally relate to LTM measurements. The UE may be configured to perform and report L1 measurements to the network on the configured LTM candidate cells for LTM cell switch decision purposes. The candidate cells may be current serving cells and/or neighboring cells. When the UE receives the LTM candidate cell configuration from the network, the UE may, alongside with LTM L1 measurements, be configured to perform L3 measurements on these cells. L3 measurements may have started before the LTM candidate cell configuration is sent, and the UE may be assumed to continue these measurements while performing LTM L1 measurements.

Legacy L3 measurements may be independent of the LTM configuration, as L3 measurements can be considered to be the basis to determine an appropriate LTM (re-)configuration (e.g., which cells are candidate cells for LTM). Typically, L3 measurement may include a larger set of cells/RSs compared to LTM L1 measurements.

The LTM cell switch decision is performed based on L1 measurements, as defined by RAN1, but Rel-18 RAN4 has discussed an option to perform LTM handover based on L3 measurements reported in L1 measurement report (see, e.g., way forward R4-2314453, RAN4 #108 meeting). This is because the UE may have limitations on how many neighboring cells for which it may perform L1 measurements, and therefore the UE may be able to perform L1 measurements only on a subset of candidate cells, which may limit the candidate cell selection to these cells. L3 measurements may be assumed to run alongside with the L1 measurements on the LTM candidate cells.

The L1 measurement report is sent to a distributed unit (DU), while the L3 measurement report is sent to a centralized unit (CU). The LTM cell switch decision is made by the DU. Therefore, to be able to use L3 measurements for LTM target cell selection by the DU, it has been proposed, in RAN4, that the UE may include L3 measurements in the L1 measurement report to enable reporting L3 measurements to the DU and, consequently, enable target cell selection by the DU based on L3 measurements.

Figure 4:
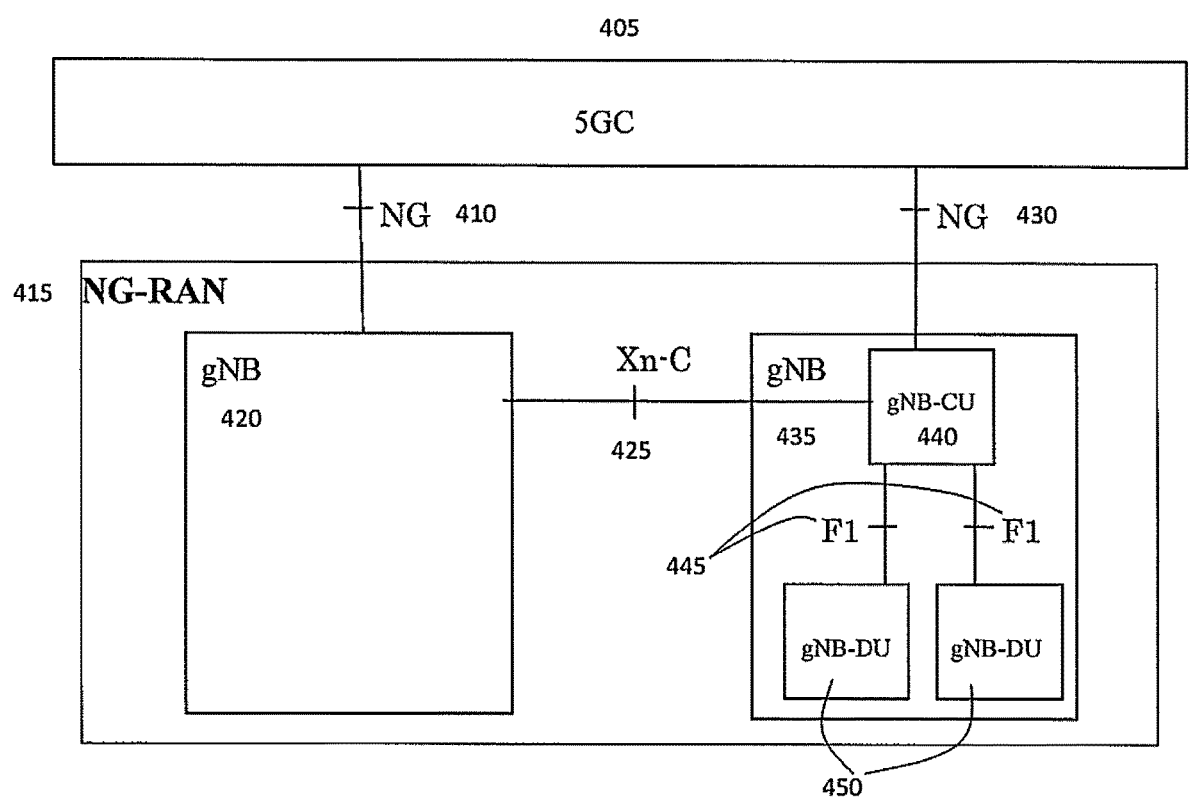
FIG. 4 is a diagram illustrating features as described herein.

Referring now to FIG. 4, illustrated is an example of DU and CU in NR, RAN architecture. The 5GC (405) may be connected to the NG-RAN (415) via NG interfaces (410, 430). The NG-RAN (415) may include multiple gNB (420, 435), which may be connected via the Xn-C interface (425). A gNB (435) may comprise a gNB-CU (440) as well as one or more gNB-DU (450) connected via F1 interface(s) (445). The latest agreements regarding L3 measurements in L1 measurement report are as shown below:

" . . . 2.2 Sub-topic 2-2 Whether to use L3 measurement results in L1 measurement report Issue 2-2-1: Whether to use final L3 measurement results for L1 measurement report <Agreement >: Introduce optional UE support to use L3 measurement results for intra-frequency and inter-frequency L1 measurement report.

Note: the solution will be removed from the WI scope if all details and CRs are not finalized in RAN4 #109. The solution will be removed from the WI scope if there is impact on RAN1/2.

Option 1:

UE Capability

UE capability is introduced to use L3 measurement results for intra-frequency and inter-frequency L1 measurement report.

If the number of cells to measure exceeds the L1 based LTM measurement capability, UE is allowed to perform L3 measurements and report them in L1 reporting format measurements.

UE supporting the L3 measurements in L1 measurement format capability should support also the baseline L1 measurement capability.

Measurement Reporting

UE reports based on L1 measurement configuration.

Measurement report mapping: No changes to Table 10.1.6.1-1 are needed due to support L3 measurements in L1 measurement report.

L3 and L1 measurements are not included in the same report, at least in rel-18

Requirements

L3 measurement requirements are followed, where applicable

RAN4 to discuss accuracy requirement during performance part.

UEs capable of reporting L3 measurements in L1 report, number of frequency layers to measure for neighbouring cell follows the same requirements as L3 measurements.

As a baseline: Intra-frequency in clause 9.2, inter-frequency in clause 9.3

TCI state activation is based on the reported L3 measurements in L1 measurement report.

In FR1, UE do not need additional SSB to meet transmit timing requirements for PRACH on neighbour cell if the L1-RSRP measurement period is with 160 ms.

For FR2, UE may need additional SSB to meet the transmit timing requirements for PRACH on neighbour cell.

Similar to baseline framework, L1 measurement format derived using L3 measurement results are reported in UCI. Same number of M and L applies. RAN4 will specify RRM requirements for the following cases RTD between cells smaller than and larger than CP scenarios are supported.

Rx SNR (i.e., the side condition) is below −3 dB but above −6 dB.

FFS for cell switch delay components.

For FR1 and FR2, whether UE need additional SSB for acquiring timing (if the TCI state is activated) is FFS.

Known and unknown cell are supported . . . "

Taking into account the above, the UE may report, to the network for each LTM candidate cell, at least one of:

L1 measurement results in L1 measurement report (reported to DU)

L3 measurement results in L1 measurement report (reported to DU, not standardized yet)

L3 measurement results in L3 measurement report (reported to CU)

Optionally, the UE may not transmit a measurement report.

Regarding the number of cells the UE is required to measure (e.g. L1 measurements) has not been agreed by RAN4 yet, but the number may be, for example, 1 to 3 neighbor cells.

Measurements, especially L1 measurements on neighboring cells, are time and energy consuming, and therefore it would be preferable from the UE point of view that the UE does not need to perform those measurements when they are not needed (e.g., when the UE is switched to another cell than the cell on which it has performed the measurements).

The purpose of early candidate cell TCI state activation in LTM procedure (i.e., TCI activation before the cell switch command is sent to the UE) is to prepare the UE for LTM cell switch and enable shorter interruption at cell switch, which in this case does not necessarily need to involve time tracking for the target TCI state. The expectation may be that the cell switch will happen within a short time frame after the early candidate cell TCI state activation, and in some cases the network may only do the early activation for the candidate cell that it considers the likely target cell. Therefore, the time period between the early TCI state activation and LTM cell switch command may be considered a period when measuring and reporting all candidate cells may not give benefits to the network LTM cell switch decision.

A technical effect of example embodiments of the present disclosure may be to optimize UE measurements when the UE is performing early TCI activation.

In an example embodiment, a special UE measurement behavior may be defined. The special UE measurement behavior may be applicable after early candidate cell TCI state activation, and may be different from the UE measurement behavior after receiving LTM candidate cell configuration.

In an example embodiment, when the UE receives from the network a MAC-CE (or multiple MAC-CEs) activating one or more TCI states for one or more LTM candidate cells, the UE may be allowed to continue or initiate L1 measurements and reporting (or L3 measurement reporting in L1 measurement report) on the LTM candidate cells/RS for which TCI state(s) are activated. In an example embodiment, when the UE receives from the network a MAC-CE (or multiple MAC-CEs) activating one or more TCI states for one or more LTM candidate cells, the UE may be allowed to relax or stop the measurements on other configured LTM candidate cells/RS.

In the present disclosure, to "relax" the measurements may mean that the UE may not need to perform some of the measurements (L1), and may only need to perform other measurements (L3) on those cells. Alternatively, to "relax" the measurements may mean that the UE does not need to perform measurements on those cells so often (i.e. frequency/periodicity), which may increase the measurement period/delay for candidate cells.

In an example embodiment, at early TCI activation, the number of L1 measurements and measurement reporting may be reduced to LTM candidate cells for which TCI states are activated, which may be assessed by the network as potential candidate cells. A technical effect of example embodiments of the present disclosure may be to reduce UE power consumption.

In an example embodiment, the special UE measurement behavior may be defined in the standard, or it may be network configured. For the latter case, related network signaling to enable, disable or define the UE measurement behavior may be included in the LTM measurement configuration and/or the early TCI state activation MAC-CE.

The special UE measurement behavior that starts from early TCI state activation for LTM candidate cell(s) may be controlled with a timer, or it may continue until the UE receives a LTM cell switch command, a new early LTM candidate cell TCI state activation command, or a new LTM candidate cell configuration either before or after the cell switch.

In an example embodiment (Option 1), when the UE receives from the network a MAC-CE activating one or more candidate cell TCI states for an LTM candidate cell, the UE may continue or initiate L1 measurements only on the LTM candidate cell(s) for which one or more TCI states are activated (hence, added to the candidate cell TCI state active list). For example, for each of the configured/activated L1 channel state information (CSI) reporting configurations, the UE may only consider the RSs (e.g. synchronization signal block (SSB) and/or channel state information reference signals (CSI-RS)) of the candidate cells in the associated resource set/configurations for L1 measurements and reporting for which at least one TCI state is activated. In another example, for each of the configured/activated L1 CSI reporting configurations, upon a candidate cell TCI activation of a candidate cell, the UE may only consider the RSs (SSB/CSI-RS) in the associated resource set/configurations for L1 measurements and reporting which are associated with an activated TCI state (e.g., RS is configured as direct/indirect quasi co-location (QCL) reference signal of the TCI state). For the cells, for which the UE has determined not to perform L1 measurements due to activated TCI state status, the UE may (continue to) perform L3 measurements.

In an alternative example embodiment (Option 2), when the UE receives from the network a MAC-CE activating one or more candidate cell TCI states for an LTM candidate cell, the UE may only continue or initiate L1 and/or L3 measurements on LTM candidate cells for which one or more TCI states are activated (hence, in the candidate cell active TCI state list) as in Option 1, but the UE may not be required to measure other LTM candidate cells.

In an example embodiment, if L3 measurements in the L1 measurement report are supported by the UE, the UE may perform and report L3 measurements in the L1 measurement report on one or more candidate cells until receiving a candidate cell TCI state activation command for a candidate cell(s). After this (when a candidate cell TCI state is activated) the UE may (Option 3) continue reporting L3 measurements in the L1 measurement report on the cell(s) and/or RSs (SSB/CSI-RSs) for which one or more TCI states are activated. For other LTM candidate cells and/or RSs, the UE may continue L3 measurements and report them in L3 measurement report. Additionally or alternatively, for other LTM candidate cells and/or RSs, the UE may not measure other candidate cells and/or RSs.

In an example embodiment (Option 4), the UE may start performing L1 measurements on the cell(s) and/or RSs (SSB/CSI-RSs) for which one or more candidate cell TCI states are activated. For other LTM candidate cells and/or RSs (SSB/CSI-RSs), the UE may continue L3 measurements and report them in either L1 or L3 measurement report. Additionally or alternatively, for other LTM candidate cells and/or RSs, the UE may continue reporting L3 measurements in the L3 measurement report. Additionally or alternatively, for other LTM candidate cells and/or RSs, the UE may not measure other candidate cells and/or RSs (SSB/CSI-RSs).

In an example embodiment, if the network is activating TCI states with separate MAC-CEs for more than one candidate cell, all above options may apply only to the one, or up to X, candidate cells for which TCI state activation was done last. In other words, the UE may only continue performing L1 measurements on $X \geq 1$ candidate cells with latest TCI state activation MAC-CE and relax/skip measurements on other candidate cells.

In an example embodiment, the behavior defined above for the UE may continue until one or more of the following occurs: the UE receives LTM cell switch command; a predefined or network indicated time has passed since TCI state activation and the UE has not received a cell switch command; the UE receives another TCI state activation command; and/or the network reconfigures LTM candidate cells with a new LTM candidate cell configuration (including or not including the candidate cell(s) being currently measured).

In an example embodiment, the behavior defined above in all the given options may continue even after a cell switch (i.e., the UE moves to a new serving cell) until a new LTM configuration is given to the UE. This is when the TCI states activated before the cell switch are retained even after the cell switch.

In an example embodiment, the measurements for a specific candidate cell may be further determined based on the TA acquisition status for the cell; this may be applied independently of or together with measurement behavior based on TCI state activation (e.g. other example embodiments of the present disclosure). In other words, the down selection of cells on which (L1) measurements are performed may be done based on either TA acquisition status or TCI state activation, or based on both. In an example, for a cell for which the UE has performed at least one physical random access channel (PRACH) transmission (i.e. LTM PRACH), the UE may continue to perform L1-RSRP measurements for these target cells. If the UE receives at least one new TCI state activation, the PRACH based measurement reduction may not be applied (e.g. until new PRACH is transmitted).

In an example embodiment, if there was no early TCI state activation before the PDCCH order, then the PDCCH order may work as the trigger for measurement down selection in a similar manner as the TCI state activation command (e.g. UE may continue to perform (L1) measurements only on the cell the PDCCH order considers). If one or more TCI states were already activated before the PDCCH order for one or more candidate cells, the PDCCH order may work as a further down selection for (L1) measurements.

In an example embodiment, if there is then another TCI state activation command after the PDCCH order, this may overwrite the down selection done based on the PDCCH order, and the UE may continue (L1) measurements on the cells that have active TCI states. This loop may continue as long as defined in the options that will stop the special measurement behavior (i.e. until a trigger to stop down-selection of cells on which measurement is performed occurs).

It may be noted that the special UE measurement behavior when one or more TCI states are activated for multiple LTM candidate cells may apply for the LTM candidate cells and/or RSs (SSBs/CSI-RSs) for which one or more TCI states are currently activated independent of how the TCI state activation for multiple cells happens (i.e. with separate or common MAC-CE), and whether each MAC-CE for early TCI state activation applies on top of the previous MAC-CE(s) or overwrites the previous MAC-CE(s).

In an example embodiment, the special UE measurement behavior may be predefined in the standard. Additionally or alternatively, the network may define the expected UE measurement behavior, for example in the LTM candidate cell configuration or another network message to the UE. Additionally or alternatively, the network may enable/disable the predefined UE measurement behavior after TCI state activation dynamically, for example in the LTM candidate cell configuration or the early TCI state activation command.

In an example embodiment, the UE measurement behavior may be configured per candidate cell. In another example embodiment, for a candidate cell, TCI state(s) specific UE measurement behavior may be configured.

In an example embodiment, the UE may be configured to perform candidate target cell measurements (this may be referred to as the first configuration). The measurements may be based (at least partially) on the first configuration. The UE may receive, from a network node, an indication to perform activation of at least one transmission configuration indicator state associated with at least one candidate target cell. The UE may determine, or the UE may be configured to determine, a second configuration for performing candidate target cell measurements in response to the indication to perform activation of the at least one transmission configuration indicator state. The second configuration may cause the UE to measure a set of candidate target cells based on the first configuration and/or the at least one indicated transmission configuration indicator state. In one example, the UE may determine the at least one candidate cell for measurement based on the activation of at least one transmission configuration indicator state (this may be e.g. the second configuration). In one example the set of candidate cells (for the second configuration) may be a set or subset or a reduced (sub)set of cells configured in the first configuration. The set of candidate target cells may be based, at least partially, on the indication to perform activation of the at least one transmission configuration indicator state. In a further example the UE may perform at least one measurement for, at least, the set of candidate target cells based, at least partially, on the second configuration.

Figure 5:
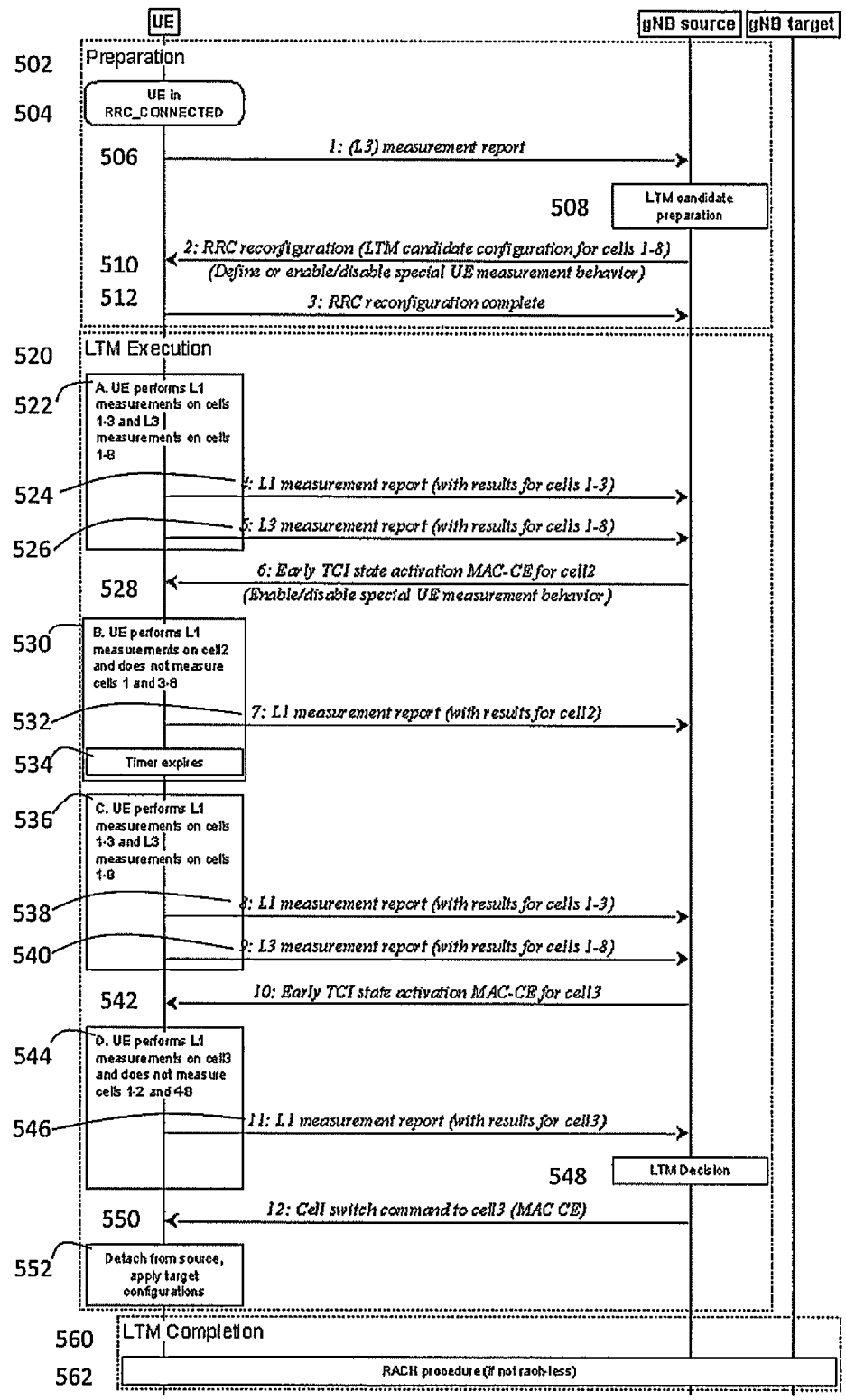
FIG. 5 is a flowchart illustrating steps as described herein.

Referring now to FIG. 5, illustrated is an example of UE measurement behavior in the LTM procedure based on candidate cell TCI state activation (e.g. Option 2). In the example of FIG. 5, examples of normal UE measurement behavior are illustrated at 522 and 536. In the example of FIG. 5, examples of relaxed UE measurement behavior based on Option 2 after early TCI state activation is illustrated at 530 and 544. In the example of FIG. 5, examples of network enabling/disabling/defining the UE measurement behavior after TCI state activation is illustrated at 510 and 528.

During a preparation phase (502), at 504 the UE may be in an RRC_CONNECTED mode. At 506, the UE may transmit, to a source gNB, a L3 measurement report. At 508, the source gNB may perform LTM candidate preparation. At 510, the source gNB may transmit, to the UE, a LTM candidate cell configuration providing a measurement and reporting configuration for candidate cells 1-8 with the related TCI state configurations. Optionally, the network may define UE measurement behavior after TCI state activation here, or enable/disable predefined/special UE measurement behavior after TCI state activation. The configuration may be provided as a RRC reconfiguration message. At 512, the UE may transmit, to the source gNB, a RRC reconfiguration complete message.

During the LTM execution phase (520), the UE may alternatively perform according to 522, 530, 536, or 544; it is not necessary for the UE to perform according to these options in this order, nor is it necessary for the UE to perform according to all these options in a given scenario. For example, it is possible for the UE to not perform any down selection of cells upon which measurement is performed; in other words, the UE may perform only according to 522 (i.e. default measurement behavior). This may occur, for example, if the early TCI state activation MAC-CE (528) is not received by the UE.

At 522 the UE may perform default measurement behavior. For example, the UE may perform measurements according to the LTM candidate cell configuration (and any other measurement configurations that apply) and based on UE measurement capability (here, as an example, the UE is capable of performing L1 measurements on 3 cells and L3 measurements on all 8 cells). At 524, the UE may transmit, to the source gNB, a L1 measurement report, for example with results for cells 1-3 based on the performed measurements. At 526, the UE may transmit, to the source gNB, a L3 measurement report, for example with results for cells 1-8 based on the performed measurements. At 528, the source gNB may transmit, to the UE, an early TCI state activation MAC-CE for cell 2. Optionally the network may enable/disable the special/predefined UE measurement behavior here, for example with a one bit value 1/0=enable/disable.

At 530, the UE may perform measurements according to measurement behavior defined in Option 2 (i.e. no measurements on other candidate cells than the ones with at least one active TCI state) either based on a predefined or network indicated behavior. In this example, a timer may be started at the TCI state activation command, and when the timer expires (and there has not been a cell switch command), the UE may stop the special measurement behavior. At 532, the UE may perform L1 measurements and transmit, to the source gNB, an L1 measurement report, for example with results for cell 2. At 534, the timer may expire.

At 536, after the timer has expired, the UE may continue to perform measurements according to the default behavior, which may be the same as at 522. At 538, the UE may transmit, to the source gNB, a L1 measurement report, for example with results for cells 1-3. At 540, the UE may transmit, to the source gNB, a L3 measurement report, for example with results for cells 1-8. At 543, the source gNB may transmit, to the UE, an early TCI state activation MAC-CE for cell 3.

At 544, the UE may perform measurements according to measurement behavior defined in Option 2 either based on predefined or network indicated behavior. The timer may also be started at this point. In this example the assumption is that the special measurement behavior only applies for one cell at a time, which is why the UE is only measuring and reporting cell3 and not cell2. However, in another option the TCI state(s) that were earlier activated for cell2 may also be considered active after this point, and the UE may continue L1 measurements on both cell 2 and cell 3, and not measure other cells. At 546, the UE may transmit, to the source gNB a L1 measurement report, for example with results for cell 3. At 548, the source gNB may determine an LTM decision. At 550, the source gNB may transmit, to the UE, a cell switch command to cell 3, for example via MAC CE. In this example, the cell switch command may be received before the expiration of the timer. At 552, the UE may detach from the source gNB, and may apply target configuration.

During an LTM completion phase (560), a RACH procedure may be performed, unless the procedure is RACH-less.

FIG. 6 illustrates the potential steps of an example method 600. The example method 600 may include: performing candidate target cell measurements based, at least partially, on a first configuration, 610; receiving, from a network node, an indication to perform activation of at least one transmission configuration indicator state associated with at least one candidate target cell, 620; determining a configuration for performing candidate target cell measurements in response to the indication to perform activation of the at least one transmission configuration indicator state, 630; and using the configuration to measure a reduced set of candidate target cells indicated with the first configuration, 640. The example method 600 may be performed, for example, with a UE. The reduced set may be a down selection of LTM candidate cells/RS for which the UE performs measurements. Additionally or alternatively, the reduced set may be a set of LTM candidate cells/RS determined by the UE in response to enablement of the special UE measurement behavior. Additionally or alternatively, the reduced set may be a set of LTM candidate cells/RS for which TCI state(s) are activated. Additionally or alternatively, the reduced set may be a set of LTM candidate cells/RS for which UE measurement(s) have not been relaxed and/or stopped.

FIG. 7 illustrates the potential steps of an example method 700. The example method 700 may include: transmitting, to a user equipment, a first configuration for performing candidate target cell measurements, 710; transmitting, to the user equipment, an indication to perform activation of at least one transmission configuration indicator state associated with at least one candidate target cell, 720; and receiving, from the user equipment, at least one measurement report, wherein the at least one measurement report comprises, at least, an indication of at least one measurement for, at least, a reduced set of candidate target cells indicated with the first configuration based, wherein the at least one measurement comprises one or more measurements performed using a configuration for performing candidate target cell measurements in response to the indication to perform activation of the at least one transmission configuration indicator state, 720. The example method 700 may be performed, for example, with a base station, a network node, an eNB, a gNB, etc. The reduced set may be a down selection of LTM candidate cells/RS for which the UE performs measurements. Additionally or alternatively, the reduced set may be a set of LTM candidate cells/RS determined by the UE in response to enablement of the special UE measurement behavior. Additionally or alternatively, the reduced set may be a set of LTM candidate cells/RS for which TCI state(s) are activated. Additionally or alternatively, the reduced set may be a set of LTM candidate cells/RS for which UE measurement(s) have not been relaxed and/or stopped.

In accordance with one example embodiment, an apparatus may comprise: at least one processor; and at least one memory storing instructions that, when executed by the at least one processor, cause the apparatus at least to: perform candidate target cell measurements based, at least partially, on a first configuration; receive, from a network node, an indication to perform activation of at least one transmission configuration indicator state associated with at least one candidate target cell; determine a configuration for performing candidate target cell measurements in response to the indication to perform activation of the at least one transmission configuration indicator state and use the configuration to measure a reduced set of candidate target cells indicated with the first configuration.

The example apparatus may be further configured to: establish a connection with the network node, wherein the network node may be configured to provide a serving cell to the apparatus.

The example apparatus may be further configured to: receive the first configuration after a connection with the network node is established.

The example apparatus may be further configured to: transmit, to the network node, at least one measurement report comprising, at least, an indication of at least one measurement for, at least, one of the set of candidate target cells.

The at least one measurement report may comprise at least one L1 measurement report.

The example apparatus may be further configured to: receive an indication to determine the configuration via at least one of: a radio resource control reconfiguration message for lower-layer triggered mobility, a lower-layer triggered mobility configuration, a transmission configuration indicator state activation medium access control message, or a one-bit value.

The configuration may be determined based on the indication to perform activation of the at least one transmission configuration indicator state associated with the at least one candidate target cell.

The example apparatus may be further configured to: transmit, to the network node, a measurement report comprising an indication of the candidate target cell measurements based, at least partially, on the first configuration.

The example apparatus may be further configured to: determine to switch from using the first configuration to using the configuration based, at least partially, on the indication to perform activation of the at least one transmission configuration indicator state associated with the at least one candidate target cell.

The example apparatus may be further configured to: stop performing measurement for one or more candidate target cells for which a respective transmission configuration indicator state is not activated, wherein the one or more candidate target cells may comprise the candidate target cells indicated with the first configuration.

The example apparatus may be further configured to: perform measurement for a first number of candidate target cells, wherein the first number of candidate target cells may be less than a number of the candidate target cells indicated with the first configuration.

The example apparatus may be further configured to: perform L3 measurements for one or more candidate target cells for which a respective transmission configuration indicator state is not activated, wherein the candidate target cells indicated with the first configuration may comprise, at least, the one or more candidate target cells.

The example apparatus may be further configured to: transmit, to the network node, at least one indication of the L3 measurements for the one or more candidate target cells via one of: a L1 measurement report, or a L3 measurement report.

Using the configuration to measure the reduced set of candidate target cells may comprise the example apparatus being further configured to: perform at least one of: at least one L1 measurement, or at least one L3 measurement.

The example apparatus may be further configured to: start a timer in response to the indication to perform activation of the at least one transmission configuration indicator state, wherein the configuration to measure the reduced set of candidate target cells is used during a duration of the timer.

The example apparatus may be further configured to: in response to expiration of the timer, perform measurements based, at least partially, on the first configuration.

The example apparatus may be further configured to: stop using the configuration to measure the reduced set of candidate target cells in response to at least one of: expiration of a predefined time period from receiving of the indication to perform activation of the at least one transmission configuration indicator state, reception of a cell switch command, reception of a radio resource control reconfiguration message, reception of a further indication to perform activation of one or more transmission configuration indicator states associated with the at least one candidate target cell, or reception of a lower-layer triggered mobility configuration; and perform measurements based, at least partially, on the first configuration.

A number of the at least one candidate target cell associated with the at least one transmission configuration indicator state may be less than or equal to a predetermined number of candidate target cells associated with most recently activated transmission configuration indicator states.

The example apparatus may be further configured to: perform one or more measurements for one or more candidate target cells for which a physical downlink control channel order has been received.

In accordance with one aspect, an example method may be provided comprising: performing, with a user equipment, candidate target cell measurements based, at least partially, on a first configuration; receiving, from a network node, an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

The example method may further comprise: establishing a connection with the network node, wherein the network node may be configured to provide a serving cell to the user equipment.

The example method may further comprise: receiving the first configuration after a connection with the network node is established.

The example method may further comprise: transmitting, to the network node, at least one measurement report comprising, at least, an indication of at least one measurement for, at least, one of the set of candidate target cells.

The at least one measurement report may comprise at least one L1 measurement report.

The example method may further comprise: receiving an indication to determine the configuration via at least one of: a radio resource control reconfiguration message for lower-layer triggered mobility, a lower-layer triggered mobility configuration, a transmission configuration indicator state activation medium access control message, or a one-bit value.

The configuration may be determined based on the indication to perform activation of the at least one transmission configuration indicator state associated with the at least one candidate target cell.

The example method may further comprise: transmitting, to the network node, a measurement report comprising an indication of the candidate target cell measurements based, at least partially, on the first configuration.

The example method may further comprise: determining to switch from using the first configuration to using the configuration based, at least partially, on the indication to perform activation of the at least one transmission configuration indicator state associated with the at least one candidate target cell.

The example method may further comprise: stopping the performing of measurement for one or more candidate target cells for which a respective transmission configuration indicator state is not activated, wherein the one or more candidate target cells may comprise the candidate target cells indicated with the first configuration.

The example method may further comprise: performing measurement for a first number of candidate target cells, wherein the first number of candidate target cells may be less than a number of the candidate target cells indicated with the first configuration.

The example method may further comprise: performing L3 measurements for one or more candidate target cells for which a respective transmission configuration indicator state is not activated, wherein the candidate target cells indicated with the first configuration may comprise, at least, the one or more candidate target cells.

The example method may further comprise: transmitting, to the network node, at least one indication of the L3 measurements for the one or more candidate target cells via one of: a L1 measurement report, or a L3 measurement report.

Using the configuration to measure the reduced set of candidate target cells may comprise: performing at least one of: at least one L1 measurement, or at least one L3 measurement.

The example method may further comprise: starting a timer in response to the indication to perform activation of the at least one transmission configuration indicator state, wherein the at least one measurement for, at least, the reduced set of candidate target cells may be performed during a duration of the timer.

The example method may further comprise: in response to expiration of the timer, performing measurements based, at least partially, on the first configuration.

The example method may further comprise: stopping using the configuration to measure the reduced set of candidate target cells in response to at least one of: expiration of a predefined time period from receiving of the indication to perform activation of the at least one transmission configuration indicator state, reception of a cell switch command, reception of a radio resource control reconfiguration message, reception of a further indication to perform activation of one or more transmission configuration indicator states associated with the at least one candidate target cell, or reception of a lower-layer triggered mobility configuration; and performing measurements based, at least partially, on the first configuration.

A number of the at least one candidate target cell associated with the at least one transmission configuration indicator state may be less than or equal to a predetermined number of candidate target cells associated with most recently activated transmission configuration indicator states.

The example method may further comprise: performing one or more measurements for one or more candidate target cells for which a physical downlink control channel order has been received.

In accordance with one example embodiment, an apparatus may comprise: circuitry configured to perform: performing candidate target cell measurements based, at least partially, on a first configuration; circuitry configured to perform: receiving, from a network node, an indication to perform activation of at least one transmission configuration indicator state associated with at least one candidate target cell; circuitry configured to perform: determining a configuration for performing candidate target cell measurements in response to the indication to perform activation of the at least one transmission configuration indicator state; and using the configuration to measure a reduced set of candidate target cells indicated with the first configuration.

In accordance with one example embodiment, an apparatus may comprise: processing circuitry; memory circuitry including computer program code, the memory circuitry and the computer program code configured to, with the processing circuitry, enable the apparatus to: perform candidate target cell measurements based, at least partially, on a first configuration; receive, from a network node, an indication to perform activation of at least one transmission configuration indicator state associated with at least one candidate target cell; determine a configuration for performing candidate target cell measurements in response to the indication to perform activation of the at least one transmission configuration indicator state; and use the configuration to measure a reduced set of candidate target cells indicated with the first configuration.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for: performing candidate target cell measurements based, at least partially, on a first configuration; receiving, from a network node, an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

The means may be further configured for: establishing a connection with the network node, wherein the network node may be configured to provide a serving cell to the apparatus.

The means may be further configured for: receiving the first configuration after a connection with the network node is established.

The means may be further configured for: transmitting, to the network node, at least one measurement report comprising, at least, an indication of at least one measurement for, at least, one of the set of candidate target cells.

The at least one measurement report may comprise at least one L1 measurement report.

The means may be further configured for: receiving an indication to determine the configuration via at least one of: a radio resource control reconfiguration message for lower-layer triggered mobility, a lower-layer triggered mobility configuration, a transmission configuration indicator state activation medium access control message, or a one-bit value.

The configuration may be determined based on the indication to perform activation of the at least one transmission configuration indicator state associated with the at least one candidate target cell.

The means may be further configured for: transmitting, to the network node, a measurement report comprising an indication of the candidate target cell measurements based, at least partially, on the first configuration.

The means may be further configured for: determining to switch from using the first configuration to using the configuration based, at least partially, on the indication to perform activation of the at least one transmission configuration indicator state associated with the at least one candidate target cell.

The means may be further configured for: stopping the performing of measurement for one or more candidate target cells for which a respective transmission configuration indicator state is not activated, wherein the one or more candidate target cells may comprise the candidate target cells indicated with the first configuration.

The means may be further configured for: performing measurement for a first number of candidate target cells, wherein the first number of candidate target cells may be less than a number of the candidate target cells indicated with the first configuration.

The means may be further configured for: performing L3 measurements for one or more candidate target cells for which a respective transmission configuration indicator state is not activated, wherein the candidate target cells indicated with the first configuration may comprise, at least, the one or more candidate target cells.

The means may be further configured for: transmitting, to the network node, at least one indication of the L3 measurements for the one or more candidate target cells via one of: a L1 measurement report, or a L3 measurement report.

The means configured for using the configuration to measure the reduced set of candidate target cells may comprise means configured for: performing at least one of: at least one L1 measurement, or at least one L3 measurement.

The means may be further configured for: starting a timer in response to the indication to perform activation of the at least one transmission configuration indicator state, wherein the configuration to measure the reduced set of candidate target cells is used during a duration of the timer.

The means may be further configured for: in response to expiration of the timer, performing measurements based, at least partially, on the first configuration.

The means may be further configured for: stopping using the configuration to measure the reduced set of candidate target cells in response to at least one of: expiration of a predefined time period from receiving of the indication to perform activation of the at least one transmission configuration indicator state, reception of a cell switch command, reception of a radio resource control reconfiguration message, reception of a further indication to perform activation of one or more transmission configuration indicator states associated with the at least one candidate target cell, or reception of a lower-layer triggered mobility configuration; and performing measurements based, at least partially, on the first configuration.

A number of the at least one candidate target cell associated with the at least one transmission configuration indicator state may be less than or equal to a predetermined number of candidate target cells associated with most recently activated transmission configuration indicator states.

The means may be further configured for: performing one or more measurements for one or more candidate target cells for which a physical downlink control channel order has been received.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: perform candidate target cell measurements based, at least partially, on a first configuration; cause receiving, from a network node, of an indication to perform activation of at least one transmission configuration indicator state associated with at least one candidate target cell; determine a configuration for performing candidate target cell measurements in response to the indication to perform activation of the at least one transmission configuration indicator state; and use the configuration to measure a reduced set of candidate target cells indicated with the first configuration.

In accordance with one example embodiment, a non-transitory computer-readable medium comprising program instructions stored thereon for performing at least the following: performing candidate target cell measurements based, at least partially, on a first configuration; causing receiving, from a network node, of an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

In accordance with another example embodiment, a non-transitory program storage device readable by a machine may be provided, tangibly embodying instructions executable by the machine for performing operations, the operations comprising: performing candidate target cell measurements based, at least partially, on a first configuration; causing receiving, from a network node, of an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

In accordance with another example embodiment, a non-transitory computer-readable medium comprising instructions that, when executed by an apparatus, cause the apparatus to perform at least the following: performing candidate target cell measurements based, at least partially, on a first configuration; causing receiving, from a network node, of an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

A computer implemented system comprising: at least one processor and at least one non-transitory memory storing instructions that, when executed by the at least one processor, cause the system at least to perform: performing candidate target cell measurements based, at least partially, on a first configuration; causing receiving, from a network node, of an indication to perform activation of at least one transmission configuration indicator state associated with at least one candidate target cell; determining a configuration for performing candidate target cell measurements in response to the indication to perform activation of the at least one transmission configuration indicator state; and using the configuration to measure a reduced set of candidate target cells indicated with the first configuration.

A computer implemented system comprising: means for performing candidate target cell measurements based, at least partially, on a first configuration; means for causing receiving, from a network node, of an indication to perform activation of at least one transmission configuration indicator state associated with at least one candidate target cell; means for determining a configuration for performing candidate target cell measurements in response to the indication to perform activation of the at least one transmission configuration indicator state; and means for using the configuration to measure a reduced set of candidate target cells indicated with the first configuration.

In accordance with one example embodiment, an apparatus may comprise: at least one processor; and at least one memory storing instructions that, when executed by the at least one processor, cause the apparatus at least to: transmit, to a user equipment, a first configuration for performing candidate target cell measurements; transmit, to the user equipment, an indication to perform activation of at least one transmission configuration indicator state associated with at least one candidate target cell; and receive, from the user equipment, at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

The example apparatus may be further configured to: establish a connection with the user equipment, wherein the apparatus may be configured to provide a serving cell to the user equipment.

The example apparatus may be further configured to: transmit, to the user equipment, the first configuration after the connection is established.

The at least one measurement report may comprise at least one L1 measurement report.

The example apparatus may be further configured to: transmit, to the user equipment, an indication to determine the configuration via at least one of: a radio resource control reconfiguration message for lower-layer triggered mobility, a lower-layer triggered mobility configuration, a transmission configuration indicator state activation medium access control message, or a one-bit value.

The example apparatus may be further configured to: receive, from the user equipment, a measurement report comprising an indication of candidate target cell measurements based, at least partially, on the first configuration.

The measurement report comprising the indication of the candidate target cell measurements based, at least partially, on the first configuration may comprise a L3 measurement report.

The indication to perform activation of the at least one transmission configuration indicator state associated with the at least one candidate target cell may be configured to cause the user equipment to switch from the first configuration to the configuration.

The example apparatus may be further configured to: receive, from the user equipment, at least one indication of L3 measurements for one or more candidate target cells, for which a respective transmission configuration indicator state is not activated, via one of: a L1 measurement report, or a L3 measurement report, wherein the candidate target cells indicated with the first configuration may comprise, at least, the one or more cells.

The at least one measurement for, at least, the reduced set of candidate target cells may comprise one of: at least one L1 measurement, or at least one L3 measurement.

The example apparatus may be further configured to: transmit, to the user equipment, a timer for a duration during which the configuration to measure the reduced set of candidate target cells may be used.

A number of the at least one candidate target cell associated with the at least one transmission configuration indicator state may be less than or equal to a predetermined number of candidate target cells associated with most recently activated transmission configuration indicator states.

In accordance with one aspect, an example method may be provided comprising: transmitting, to a user equipment, a first configuration for performing candidate target cell measurements; transmitting, with a network node to the user equipment, an indication to perform activation of at least one transmission configuration indicator state associated with at least one candidate target cell; and receiving, from the user equipment, at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

The example method may further comprise: establishing a connection with the user equipment, wherein the network node may be configured to provide a serving cell to the user equipment.

The example method may further comprise: transmitting, to the user equipment, the first configuration after the connection is established.

The at least one measurement report may comprise at least one L1 measurement report.

The example method may further comprise: transmitting, to the user equipment, an indication to determine the configuration via at least one of: a radio resource control reconfiguration message for lower-layer triggered mobility, a lower-layer triggered mobility configuration, a transmission configuration indicator state activation medium access control message, or a one-bit value.

The example method may further comprise: receiving, from the user equipment, a measurement report comprising an indication of candidate target cell measurements based, at least partially, on the first configuration.

The measurement report comprising the indication of the candidate target cell measurements based, at least partially, on the first configuration may comprise a L3 measurement report.

The indication to perform activation of the at least one transmission configuration indicator state associated with the at least one candidate target cell may be configured to cause the user equipment to switch from the first configuration to the configuration.

The example method may further comprise: receiving, from the user equipment, at least one indication of L3 measurements for one or more candidate target cells, for which a respective transmission configuration indicator state is not activated, via one of: a L1 measurement report, or a L3 measurement report, wherein the candidate target cells indicated with the first configuration may comprise, at least, the one or more cells.

The at least one measurement for, at least, the reduced set of candidate target cells may comprise one of: at least one L1 measurement, or at least one L3 measurement.

The example method may further comprise: transmitting, to the user equipment, a timer for a duration during which the configuration to measure the reduced set of candidate target cells may be used.

A number of the at least one candidate target cell associated with the at least one transmission configuration indicator state may be less than or equal to a predetermined number of candidate target cells associated with most recently activated transmission configuration indicator states.

In accordance with one example embodiment, an apparatus may comprise: circuitry configured to perform: transmitting, to a user equipment, a first configuration for performing candidate target cell measurements; circuitry configured to perform: transmitting, to the user equipment, an indication to perform activation of at least one transmission configuration indicator state associated with at least one candidate target cell; and circuitry configured to perform: receiving, from the user equipment, at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a first configuration for performing candidate target cell measurements; transmit, to the user equipment, an indication to perform activation of at least one transmission configuration indicator state associated with at least one candidate target cell; and receive, from the user equipment, at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

In accordance with one example embodiment, an apparatus may comprise means for: transmitting, to a user equipment, a first configuration for performing candidate target cell measurements; transmitting, to the user equipment, an indication to perform activation of at least one transmission configuration indicator state associated with at least one candidate target cell; and receiving, from the user equipment, at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

The means may be further configured for: establishing a connection with the user equipment, wherein the apparatus may be configured to provide a serving cell to the user equipment.

The means may be further configured for: transmitting, to the user equipment, the first configuration after the connection is established.

The at least one measurement report may comprise at least one L1 measurement report.

The means may be further configured for: transmitting, to the user equipment, an indication to determine the configuration via at least one of: a radio resource control reconfiguration message for lower-layer triggered mobility, a lower-layer triggered mobility configuration, a transmission configuration indicator state activation medium access control message, or a one-bit value.

The means may be further configured for: receiving, from the user equipment, a measurement report comprising an indication of candidate target cell measurements based, at least partially, on the first configuration.

The measurement report comprising the indication of the candidate target cell measurements based, at least partially, on the first configuration may comprise a L3 measurement report.

The indication to perform activation of the at least one transmission configuration indicator state associated with the at least one candidate target cell may be configured to cause the user equipment to switch from the first configuration to the configuration.

The means may be further configured for: receiving, from the user equipment, at least one indication of L3 measurements for one or more candidate target cells, for which a respective transmission configuration indicator state is not activated, via one of: a L1 measurement report, or a L3 measurement report, wherein the candidate target cells indicated with the first configuration may comprise, at least, the one or more cells.

The at least one measurement for, at least, the reduced set of candidate target cells may comprise one of: at least one L1 measurement, or at least one L3 measurement.

The means may be further configured for: transmitting, to the user equipment, a timer for a duration during which the configuration to measure the reduced set of candidate target cells may be used.

A number of the at least one candidate target cell associated with the at least one transmission configuration indicator state may be less than or equal to a predetermined number of candidate target cells associated with most recently activated transmission configuration indicator states.

In accordance with one example embodiment, a non-transitory computer-readable medium comprising instructions stored thereon which, when executed with at least one processor, cause the at least one processor to: cause transmitting, to a user equipment, a first configuration for performing candidate target cell measurements; cause transmitting, to the user equipment, of an indication to perform activation of at least one transmission configuration indicator state associated with at least one candidate target cell; and cause receiving, from the user equipment, of at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

In accordance with one example embodiment, a non-transitory computer-readable medium comprising program instructions stored thereon for performing at least the following: causing transmitting, to a user equipment, a first configuration for performing candidate target cell measurements; causing transmitting, to the user equipment, of an indication to perform activation of at least one transmission configuration indicator state associated with at least one candidate target cell; and causing receiving, from the user equipment, of at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

In accordance with another example embodiment, a non-transitory program storage device readable by a machine may be provided, tangibly embodying instructions executable by the machine for performing operations, the operations comprising: causing transmitting, to a user equipment, a first configuration for performing candidate target cell measurements; causing transmitting, to the user equipment, of an indication to perform activation of at least one transmission configuration indicator state associated with at least one candidate target cell; and causing receiving, from the user equipment, of at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

In accordance with another example embodiment, a non-transitory computer-readable medium comprising instructions that, when executed by an apparatus, cause the apparatus to perform at least the following: causing transmitting, to a user equipment, a first configuration for performing candidate target cell measurements; causing transmitting, to the user equipment, of an indication to perform activation of at least one transmission configuration indicator state associated with at least one candidate target cell; and causing receiving, from the user equipment, of at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

A computer implemented system comprising: at least one processor and at least one non-transitory memory storing instructions that, when executed by the at least one processor, cause the system at least to perform: causing transmitting, to a user equipment, a first configuration for performing candidate target cell measurements; causing transmitting, to the user equipment, of an indication to perform activation of at least one transmission configuration indicator state associated with at least one candidate target cell; and causing receiving, from the user equipment, of at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

A computer implemented system comprising: means for causing transmitting, to a user equipment, a first configuration for performing candidate target cell measurements; means for causing transmitting, to the user equipment, of an indication to perform activation of at least one transmission configuration indicator state associated with at least one candidate target cell; and means for causing receiving, from the user equipment, of at least one measurement report, wherein the at least one measurement report may comprise, at least, an indication of at least one measurement for, at least, a reduced set of candidate target cells indicated with the first configuration based, wherein the at least one measurement may comprise one or more measurements performed using a configuration for performing candidate target cell measurements in response to the indication to perform activation of the at least one transmission configuration indicator state.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one memory storing instructions that, when executed by the at least one processor, cause the apparatus at least to:
   perform candidate target cell measurements based, at least partially, on a first configuration;
   receive, from a network node, an indication to perform activation of at least one transmission configuration indicator state associated with at least one candidate target cell;
   determine a configuration for performing candidate target cell measurements in response to the indication to perform activation of the at least one transmission configuration indicator state;
   use the configuration to measure a reduced set of candidate target cells indicated with the first configuration; and
   start a timer in response to the indication to perform activation of the at least one transmission configuration indicator state, wherein the configuration to measure the reduced set of candidate target cells is used during a duration of the timer.

2. The apparatus of claim 1, wherein the at least one memory stores instructions that, when executed by the at least one processor, cause the apparatus to:
   receive the first configuration after a connection with the network node is established.

3. The apparatus of claim 1, wherein the at least one memory stores instructions that, when executed by the at least one processor, cause the apparatus to:
receive an indication to determine the configuration via at least one of:
a radio resource control reconfiguration message for lower-layer triggered mobility,
a lower-layer triggered mobility configuration,
a transmission configuration indicator state activation medium access control message, or
a one-bit value.

4. The apparatus of claim 1, wherein the configuration is determined based on the indication to perform activation of the at least one transmission configuration indicator state associated with the at least one candidate target cell.

5. The apparatus of claim 1, wherein the at least one memory stores instructions that, when executed by the at least one processor, cause the apparatus to:
determine to switch from using the first configuration to using the configuration based, at least partially, on the indication to perform activation of the at least one transmission configuration indicator state associated with the at least one candidate target cell.

6. The apparatus of claim 1, wherein the at least one memory stores instructions that, when executed by the at least one processor, cause the apparatus to:
stop performing measurement for one or more candidate target cells for which a respective transmission configuration indicator state is not activated, wherein the one or more candidate target cells comprise the candidate target cells indicated with the first configuration.

7. The apparatus of claim 1, wherein the at least one memory stores instructions that, when executed by the at least one processor, cause the apparatus to:
perform measurement for a first number of candidate target cells, wherein the first number of candidate target cells is less than a number of the candidate target cells indicated with the first configuration.

8. The apparatus of claim 1, wherein the at least one memory stores instructions that, when executed by the at least one processor, cause the apparatus to:
perform L3 measurements for one or more candidate target cells for which a respective transmission configuration indicator state is not activated, wherein the candidate target cells indicated with the first configuration comprise, at least, the one or more candidate target cells.

9. The apparatus of claim 8, wherein the at least one memory stores instructions that, when executed by the at least one processor, cause the apparatus to:
transmit, to the network node, at least one indication of the L3 measurements for the one or more candidate target cells via one of:
a L1 measurement report, or
a L3 measurement report.

10. The apparatus of claim 1, wherein using the configuration to measure the reduced set of candidate target cells comprises the at least one memory stores instructions that, when executed by the at least one processor, cause the apparatus to:
perform at least one of:
at least one L1 measurement, or
at least one L3 measurement.

11. The apparatus of claim 1, wherein the at least one memory stores instructions that, when executed by the at least one processor, cause the apparatus to:
in response to expiration of the timer, perform measurements based, at least partially, on the first configuration.

12. The apparatus of claim 1, wherein the at least one memory stores instructions that, when executed by the at least one processor, cause the apparatus to:
stop using the configuration to measure the reduced set of candidate target cells in response to at least one of:
expiration of a predefined time period from receiving of the indication to perform activation of the at least one transmission configuration indicator state,
reception of a cell switch command,
reception of a radio resource control reconfiguration message,
reception of a further indication to perform activation of one or more transmission configuration indicator states associated with the at least one candidate target cell, or
reception of a lower-layer triggered mobility configuration; and
perform measurements based, at least partially, on the first configuration.

13. The apparatus of claim 1, wherein a number of the at least one candidate target cell associated with the at least one transmission configuration indicator state is less than or equal to a predetermined number of candidate target cells associated with most recently activated transmission configuration indicator states.

14. The apparatus of claim 1, wherein the at least one memory stores instructions that, when executed by the at least one processor, cause the apparatus to:
perform one or more measurements for one or more candidate target cells for which a physical downlink control channel order has been received.

15. An apparatus comprising:
at least one processor; and
at least one memory storing instructions that, when executed by the at least one processor, cause the apparatus at least to:
transmit, to a user equipment, a first configuration for performing candidate target cell measurements;
transmit, to the user equipment, an indication to perform activation of at least one transmission configuration indicator state associated with at least one candidate target cell;
receive, from the user equipment, at least one measurement report, wherein the at least one measurement report comprises, at least, an indication of at least one measurement for, at least, a reduced set of candidate target cells indicated with the first configuration based, wherein the at least one measurement comprises one or more measurements performed using a configuration for performing candidate target cell measurements in response to the indication to perform activation of the at least one transmission configuration indicator state; and
transmit, to the user equipment, a timer for a duration during which the configuration to measure the reduced set of candidate target cells is to be used.

16. The apparatus of claim 15, wherein the at least one memory stores instructions that, when executed by the at least one processor, cause the apparatus to:
transmit, to the user equipment, an indication to determine the configuration via at least one of:
a radio resource control reconfiguration message for lower-layer triggered mobility,
a lower-layer triggered mobility configuration, a transmission configuration indicator state activation medium access control message, or a one-bit value.

17. The apparatus of claim 15, wherein the indication to perform activation of the at least one transmission configuration indicator state associated with the at least one candidate target cell is configured to cause the user equipment to switch from the first configuration to the configuration.

18. The apparatus of claim 15, wherein the at least one memory stores instructions that, when executed by the at least one processor, cause the apparatus to:

receive, from the user equipment, at least one indication of L3 measurements for one or more candidate target cells, for which a respective transmission configuration indicator state is not activated, via one of:

a L1 measurement report, or a L3 measurement report, wherein the candidate target cells indicated with the first configuration comprise, at least, the one or more candidate target cells.

19. The apparatus of claim 15, wherein the at least one measurement for, at least, the reduced set of candidate target cells comprises one of:

at least one L1 measurement, or at least one L3 measurement.

20. The apparatus of claim 15, wherein a number of the at least one candidate target cell associated with the at least one transmission configuration indicator state is less than or equal to a predetermined number of candidate target cells associated with most recently activated transmission configuration indicator states.

21. An apparatus comprising:
at least one processor; and
at least one memory storing instructions that, when executed by the at least one processor, cause the apparatus at least to:
perform candidate target cell measurements based, at least partially, on a first configuration;
receive, from a network node, an indication to perform activation of at least one transmission configuration indicator state associated with at least one candidate target cell;
determine a configuration for performing candidate target cell measurements in response to the indication to perform activation of the at least one transmission configuration indicator state; and
use the configuration to measure a reduced set of candidate target cells indicated with the first configuration;
stop using the configuration to measure the reduced set of candidate target cells in response to at least one of:
expiration of a predefined time period from receiving of the indication to perform activation of the at least one transmission configuration indicator state,
reception of a cell switch command,
reception of a radio resource control reconfiguration message,
reception of a further indication to perform activation of one or more transmission configuration indicator states associated with the at least one candidate target cell, or
reception of a lower-layer triggered mobility configuration; and
perform measurements based, at least partially, on the first configuration.

* * * * *